(12) United States Patent
Jarvenpaa et al.

(10) Patent No.: US 12,025,796 B2
(45) Date of Patent: Jul. 2, 2024

(54) APPARATUS, METHOD, AND SYSTEM FOR USE IN A DISPLAY

(71) Applicant: Nokia Technologies Oy, Espoo (FI)

(72) Inventors: Toni Jarvenpaa, Akaa (FI); Jyrki Kimmel, Tampere (FI); Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 585 days.

(21) Appl. No.: 17/414,151

(22) PCT Filed: Dec. 27, 2018

(86) PCT No.: PCT/FI2018/050982
§ 371 (c)(1),
(2) Date: Jun. 15, 2021

(87) PCT Pub. No.: WO2020/136306
PCT Pub. Date: Jul. 2, 2020

(65) Prior Publication Data
US 2022/0082824 A1 Mar. 17, 2022

(51) Int. Cl.
*G02B 27/01* (2006.01)
*B60K 35/00* (2024.01)
(Continued)

(52) U.S. Cl.
CPC ..... *G02B 27/0101* (2013.01); *G02B 27/0081* (2013.01); *G02B 27/30* (2013.01); *G02B 27/4205* (2013.01); *G02B 2027/013* (2013.01)

(58) Field of Classification Search
CPC ........ G02B 27/0101; G02B 2027/0123; G02B 2027/012; G02B 2027/013; G02B 27/0172; G02B 27/4205; G02B 6/0013; G02B 6/0015; G02B 6/002; G02B 6/0045; G02B 6/0011; B60K 35/00
See application file for complete search history.

(56) References Cited

U.S. PATENT DOCUMENTS

| 5,760,931 A | 6/1998 | Saburi et al. ................ 359/13 |
| 2012/0044573 A1 | 2/2012 | Simmonds et al. .......... 359/630 |

(Continued)

FOREIGN PATENT DOCUMENTS

| DE | 10 2016 115938 A1 | 3/2018 |
| GB | 2554575 A | 4/2018 |
| WO | WO 2017/120346 A1 | 7/2017 |

*Primary Examiner* — Ryan D Howard
(74) *Attorney, Agent, or Firm* — Harrington & Smith

(57) ABSTRACT

Certain examples of the present invention relate to an apparatus, method, and system for use in a display Certain examples provide an apparatus including a waveguide including a plurality of diffractive sections configured to: in-couple an input beam of light into the waveguide, expand the input beam of light, and out-couple the expanded beam of light from the waveguide to provide an expanded output light beam configured for use in a reflection based heads-up display system wherein the expanded output light beam is directed to a curved reflective surface, having a non-zero optical power, for reflection therefrom to a user's eye; wherein the waveguide is configured to adjust the expanded output light beam so as to compensate for the optical power of the curved reflective surface and provide a collimated reflected expanded output light beam to the user's eye.

19 Claims, 7 Drawing Sheets

FIG. 9

(51) Int. Cl.
  *G02B 27/00* (2006.01)
  *G02B 27/30* (2006.01)
  *G02B 27/42* (2006.01)

(56) References Cited

U.S. PATENT DOCUMENTS

2014/0043689 A1 2/2014 Mason .......................... 359/630
2018/0292593 A1 10/2018 Alexander
2018/0299678 A1 10/2018 Singer et al.
2019/0187465 A1* 6/2019 Erler ................. G02B 27/0081

* cited by examiner

APPARATUS, METHOD, AND SYSTEM FOR USE IN A DISPLAY

CROSS REFERENCE TO RELATED APPLICATION

This patent application is a U.S. National Stage application of International Patent Application Number PCT/FI2018/050982 filed Dec. 27, 2018, which is hereby incorporated by reference in its entirety.

TECHNOLOGICAL FIELD

Examples of the present disclosure relate to an apparatus, method, and system for use in a display. Some examples, though without prejudice to the foregoing, relate to an apparatus, method, and system for use in a reflection based heads-up display of a vehicle.

BACKGROUND

Conventional displays are not always optimal. It is useful to provide an improved apparatus for a display, such as a reflection based Heads Up Display (HUD).

Typically, a conventional HUD comprises: a projection unit and a semi-reflective transparent combiner. The projection unit generates an out of focus image which is projected towards the semi-reflective transparent combiner which is located directly in front of a viewer. The semi-reflective transparent combiner, e.g. an angled curved piece of glass, reflects/redirects and refocuses the projected image from the projector unit to the viewer's eye such that the viewer is able to see a collimated virtual image, as well as also see the background real world view through the semi-reflective transparent combiner. In such examples, the combiner is optimized together with the projector to provide a collimated virtual image. The collimated virtual image is perceived by the viewer to have a focal point that is at infinity. Such a collimated image avoids the viewer's eyes having to refocus from near field viewing to far field viewing when switching between looking at the collimated virtual image content (e.g. augmented reality or virtual content) and the background real world view.

In some HUD implementations, the projection unit generates a projected collimated image which is reflected/redirected from a flat combiner to the viewer's eye. Again, a collimated virtual image is perceived by the viewer to have a focal point that is at infinity.

In a vehicle HUD, the non-flat/non-planar/curved shape of the vehicle's windscreen and its non-zero optical power would introduce distortions in a projected collimated image reflected therefrom. This may distort a projected image shown to a viewer, possibly also making the image to be shown wholly or partially out of focus. Accordingly, rather than using the vehicle's windscreen as a reflecting surface, instead a separate reflecting component (i.e. transparent combiner) is typically used to reflect the projected collimated image to the viewer's eyes. However, such a separate reflecting component, disposed between the user and the windshield, may be a potential hazard for the user, for example were the vehicle to be involved in a collision.

The listing or discussion of any prior-published document or any background in this specification should not necessarily be taken as an acknowledgment that the document or background is part of the state of the art or is common general knowledge. One or more aspects/examples of the present disclosure may or may not address one or more of the background issues.

BRIEF SUMMARY

According to various, but not necessarily all, examples of the disclosure there is provided an apparatus comprising: a waveguide comprising a plurality of diffractive means configured to: in-couple an input beam of light into the waveguide, expand the input beam of light, and out-couple the expanded beam of light from the waveguide to provide an expanded output light beam configured for use in a reflection based heads-up display system wherein the expanded output light beam is directed to a curved reflective surface, having a non-zero optical power, for reflection therefrom to a user's eye; wherein the waveguide is configured to adjust the expanded output light beam so as to compensate for the optical power of the curved reflective surface and provide a collimated reflected expanded output light beam to the user's eye.

According to various, but not necessarily all, examples of the disclosure there is provided an apparatus comprising: a waveguide comprising a plurality of diffractive means configured to: in-couple an input beam of light into the waveguide, expand the input beam of light, and out-couple the expanded beam of light from the waveguide, wherein the waveguide is suitable for use in providing an expanded output light beam for use in a reflection based heads-up display system wherein the expanded output light beam is directed to a curved reflective surface, having a non-zero optical power, for reflection therefrom to provide a collimated reflected expanded output light beam to a user's eye; wherein the waveguide is configured to have a first curvature in a first direction and a second, differing, curvature in a second, differing, direction.

According to various, but not necessarily all, examples of the disclosure there is provided a waveguide comprising a plurality of diffractive optical elements configured to: in-couple an input beam of light into the waveguide, expand the input beam of light, and out-couple the expanded beam of light from the waveguide to provide an expanded output light beam configured for use in a reflection based heads-up display system wherein the expanded output light beam is directed to a curved reflective surface, having a non-zero optical power, for reflection therefrom to a user's eye; wherein the waveguide is configured to adjust the expanded output light beam so as to compensate for the optical power of the curved reflective surface and provide a collimated reflected expanded output light beam to the user's eye.

According to various, but not necessarily all, examples of the disclosure there is provided a module and/or a system comprising the above apparatuses.

According to various, but not necessarily all, examples of the disclosure there is provided a method comprising causing, at least in part, actions that result in: receiving, at a waveguide, an input light beam; in-coupling, via first diffraction means of the waveguide, the input light beam into the waveguide; expanding and out-coupling, via at least second diffraction means of the waveguide, the in-coupled input light beam to provide an expanded output light beam configured for use in a reflection based heads-up display system; wherein the waveguide is configured to adjust the expanded output light beam so as to compensate for a non-zero optical power of a curved reflective surface of the reflection based heads-up display and provide a collimated reflected expanded output light beam to the user's eye.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1:
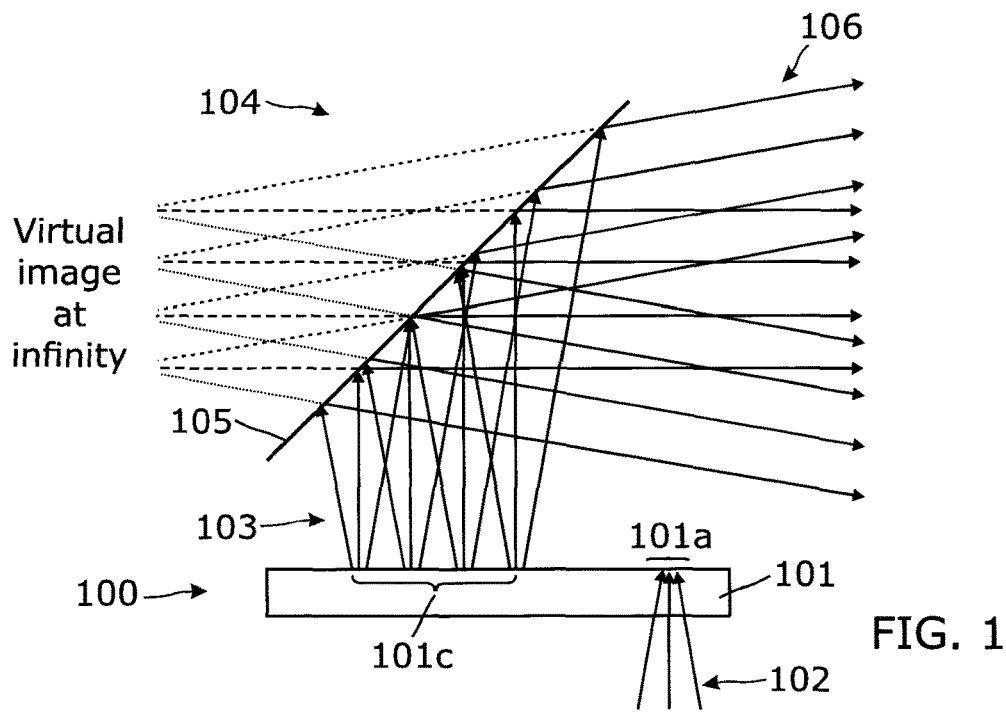
FIG. 1 schematically illustrates an example of a HUD system comprising a flat planar diffractive waveguide with collimated image output and a flat planar reflective surface.

The Figures are not necessarily to scale. Certain features and views of the figures may be shown schematically or exaggerated in scale in the interest of clarity and conciseness. For example, the dimensions of some elements in the figures may be exaggerated relative to other elements to aid explication. Similar reference numerals are used in the figures to designate similar features. For clarity, all reference numerals are not necessarily displayed in all figures.

DETAILED DESCRIPTION

FIGS. 4-11 schematically illustrate an apparatus 400 comprising a waveguide/light guide 401. The waveguide comprises a plurality of diffractive means 401a, 401c configured to: in-couple an input beam of light 402 into the waveguide, expand the in-coupled light beam, and out-couple the expanded light beam out of the waveguide to provide an expanded output light beam 403. The expanded output light beam is configured for use in a reflection based heads-up display system 404 wherein the expanded output light beam is directed to a curved reflective surface 405, having a non-zero optical power, for reflection therefrom to a user's eye. The waveguide is configured to adjust the expanded output light beam so as to compensate for the optical power of the curved reflective surface and provide a collimated reflected expanded output light beam 406 to the user's eye. In some, but not necessarily all examples, a shape of at least a part of the waveguide is configured so as to adjust the expanded output light beam in order to compensate for the optical power of the curved reflective surface and provide the collimated reflected expanded output light beam to the user's eye.

Without limiting the scope of the claims, a technical advantage/technical effect of various, but not necessarily all, examples of the present disclosure may be to provide an apparatus for a collimated image display system, such as a HUD system, that may utilise a curved reflective surface. Advantageously, in some but not necessarily all examples, when used in automotive and avionics applications, instead of providing a separate dedicated reflective component (e.g. a combiner), a car/plane's windscreen/cockpit window may be used as the reflective surface. Advantageously, this may avoid the need for separate additional components, such as a dedicated combiner. Alternatively, where a dedicated separate combiner is used for the reflective surface, a curved combiner may be utilised.

Furthermore, the use of the diffractive waveguide that (in addition to compensating for distortions of the curved reflective surface) both expands the exit pupil of the projected image and outputs the compensated projected image, effectively enlarges/extends the eye box of the output light beam thereby enabling a smaller input beam (and hence accordingly a smaller projection unit/optical engine) to be utilised as compared to projection units/optical engines of conventional HUDs. Thus the size, amount of space (and weight) required for the projection unit/optical engine may be less.

FIG. 1 schematically illustrates a side-on cross sectional view of an apparatus 100 comprising a flat/planar diffractive exit pupil expander (EPE) waveguide 101, used in a HUD system 104. A light projection unit/optical engine (not shown) provides a collimated input beam 102 incident to the flat diffractive EPE waveguide 101. The flat diffractive EPE waveguide 101 comprises a plurality of diffractive means 101a, 101b, and 101c configured to in-couple, expand, and out-couple the input collimated light beam 102 to provide an expanded output collimated light beam 103. The collimated expanded output light beam 103 is directed towards a flat planar reflective surface 105, which reflects the collimated expanded output light beam towards a viewer's eyes, thereby providing a reflection based HUD system 104 providing a collimated reflected expanded output light beam 106 to the viewer's eye(s) (not shown), which enables the viewer to perceive a virtual image that is focused at infinity.

Figure 2:
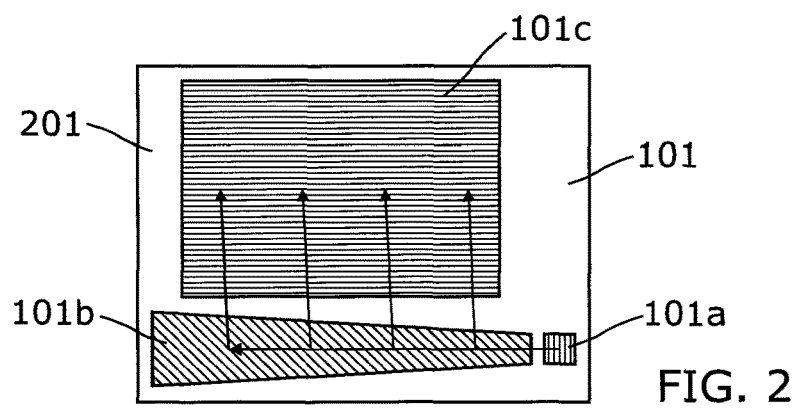
FIG. 2 schematically illustrates a diffractive waveguide for use in the HUD system of FIG. 1.

FIG. 2 illustrates a plan view of the flat diffractive EPE waveguide 101. The flat diffractive EPE waveguide 101 comprises a substrate 201 of an optical medium and a plurality of diffractive means 101a, 101b, and 101c. The first diffractive means 101a is configured to in-couple the input beam of light 102 from the projector (not shown) into the waveguide substrate 201. The in-coupled beam of light is directed, via total internal reflection, to the second diffractive means 101b which is configured to expand the in-coupled beam of light (in one dimension/direction). The expanded in-coupled beam of light is directed, via total internal reflection, to the third diffractive means 101c which is configured to further expand the in-coupled beam of light (in another dimension/direction) and also out-couple the expanded beam of light from the waveguide to provide an expanded output light beam 103.

In some, but not necessarily all examples, the diffractive means are diffractive optical elements (DOE's), e.g. an in-coupling DOE configured to receive an input light beam and in-couple the same into the substrate of the waveguide via diffraction, one or more intermediate DOE's configured to expanded the in-coupled light beam in one or more directions via diffraction, and an out-coupling DOE configured to out-couple the in-coupled and expanded light beam out of the substrate of the waveguide via diffraction to provide an output light beam. In some, but not necessarily examples, the diffractive means are diffraction gratings, e.g. a surface relief pattern of parallel lines/grooves/rulings on the waveguide substrate.

Figure 3:
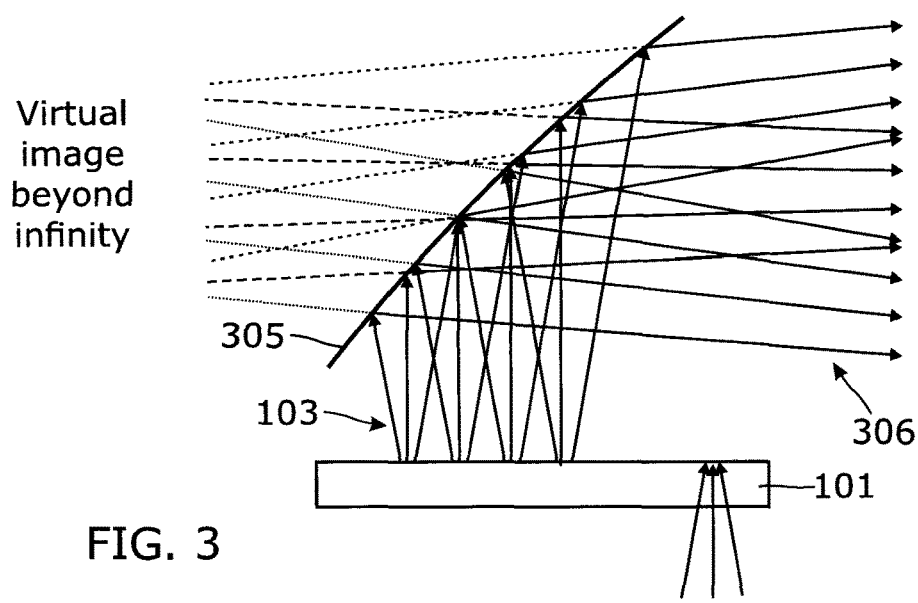
FIG. 3 schematically illustrates an example of a HUD system comprising a flat planar diffractive waveguide with collimated image output and a curved reflective surface distorting the image.

FIG. 3 schematically illustrates a side on view of the flat diffractive EPE waveguide 101 when used with a non-flat/non-planar/curved reflective surface 305. The curved reflective surface 305 has a non-zero optical power. Accordingly, when the collimated expanded output light beam 103 reflects from the curved reflective surface 305 (in this example a concave reflective surface) it distorts the reflected beam 306 such that the reflected light beam is no longer collimated, i.e. comprising parallel rays, but instead comprises converging rays. Effectively, the curved reflective surface imparts a focusing effect of the reflected light beam such that the reflected light beam is diverging and is no longer collimated. A viewer is (likely) not able to focus the virtual image (as its focus point is, in effect, beyond infinity). Thus, such a flat diffractive EPE waveguide 101 is not optimized to be used for a reflection based HUD with a curved reflective surface.

Figure 4A:
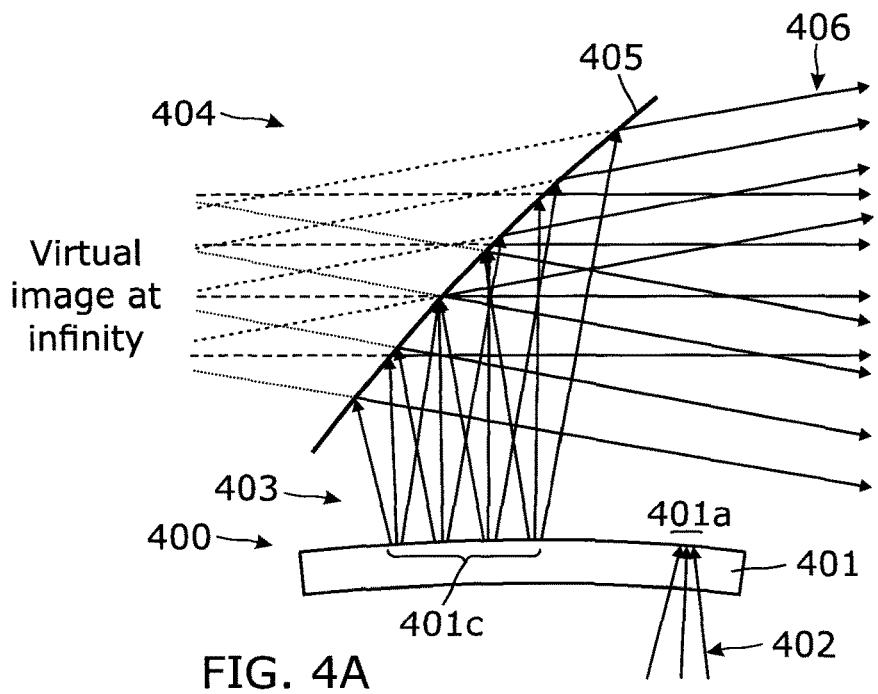
FIG. 4A schematically illustrates an example of an apparatus according to the present disclosure.

FIG. 4A schematically illustrates a side on view of an apparatus 400 according to a first aspect of the present disclosure. FIG. 4 focuses on the functional components necessary for describing the operation of the apparatus 400. The apparatus 400 comprises a diffractive waveguide 401 for use in a reflection based heads-up display system 404, wherein the diffractive waveguide 401 is configured so as to enable the utilisation of a curved reflective surface 405 having a non-zero optical power. As will be discussed in greater detail below, a shape of at least a part of the diffractive waveguide 401 is configured to adjust an output light beam 403 out-coupled from the diffractive waveguide so as to compensate for the optical power of the curved reflective surface 405 and provide a collimated reflected output light beam 406 to the user's eyes (not shown).

The waveguide 401 is configured, e.g. not least by virtue of its curved shape, so as to compensate for/rectify the distortion introduced by the curved reflective surface and its non-zero optical power. The waveguide intrinsically compensates for the curved reflective surface's distortion by having a shape that matches/compliments that of the curved reflective surface thereby, in effect rectifying the distortion introduced by the reflection from the curved surface. Compensating for such distortion advantageously enables a curved reflective surface to be used in a reflective based HUD system whilst still maintaining the provision of a collimated beam to the viewer's eyes and the perception of a virtual image focused at (or near) infinity. By way of non-limiting example, the reflective surface may have an optical power of −1 diopter and the waveguide may thus be configured to have an optical power of +1 diopter, such that the total optical power of the waveguide and reflective surface is zero.

The apparatus may be provided in a module. As used here 'module' refers to a unit or apparatus that excludes certain parts/components (e.g. not least the reflective surface itself) that would be added by an end manufacturer or a user.

In some, but not necessarily all examples, the waveguide is configured to have an optical power opposite to the optical power of the curved reflective surface. In some, but not necessarily all examples, the shape of the at least a part of the waveguide 401 is configured to have a shape that is dependent on the shape of the curved reflective surface so as to compensate for the optical power of the curved reflective surface.

The projector (not shown) provides an input beam 402 incident to the curved diffractive waveguide 401. The curved diffractive waveguide expands and outputs an expanded output light beam 403. However, due to the convex shape of the curved diffractive waveguide 401, the out-coupled light beam 403 is not collimated but is instead divergent. The shape of the curved diffractive waveguide 401 is configured to apply a degree of divergence to the output light beam 403 that compensates for the optical power of the curved reflective surface 405 and counteracts the converging/focusing imparted by the same such the divergent expanded output light beam 403, once reflected from the curved reflective surface 405 is collimated such that a collimated expanded output light beam 406 is directed towards a viewer's eyes. Advantageously, examples may be used in a reflection based HUD system 404 for providing a collimated reflected expanded output light beam 406 to the viewer's eye via a curved reflective surface 405, e.g. windscreen of a vehicle or a curved separate combiner/reflector, to thereby enable the viewer to perceive a virtual image that is focused at infinity.

In some, but not necessarily all examples, the waveguide is a diffractive exit pupil expander (EPE), for example similar to that of FIGS. 1-3, albeit a curved EPE configured to compensate for the optical power of the reflective surface.

In some, but not necessarily all examples, the waveguide is configured to have an optical power opposite to the optical power of the curved reflective surface.

In some, but not necessarily all examples, a combination of both the waveguide and the reflective surface are configured such that the sum of their optical power is substantially zero.

In some, but not necessarily all examples, the optical power of the waveguide is controlled by other means besides surface curvature.

In some, but not necessarily all examples, the shapes of an upper surface of the waveguide and a lower surface of the waveguide are configured so as to compensate for the optical power of the curved reflective surface, i.e. the shapes of the upper and lower surfaces are dependent, not least, on the shape of the curved reflective surface.

In some, but not necessarily all examples, the waveguide is configured to have a curvature that is configured to compensate for the optical power of the curved reflective surface, i.e. the curvature of the waveguide is dependent, not least, on the curvature of the curved reflective surface. In some, but not necessarily all examples, the waveguide is configured to have a local radius of curvature that is configured to compensate for the optical power of the curved reflective surface, i.e. the local radius of curvature of the waveguide is dependent, not least, on a radius of curvature of the curved reflective surface.

In some, but not necessarily all, examples the reflective surface is a windscreen, windshield or window of a vehicle or cockpit. In some, but not necessarily all, examples the vehicle is a motor vehicle e.g. not least for example: a car, a bus, a coach, or a motorbike. In some examples, the vehicle is an aircraft, e.g. not least for example: an airplane or a helicopter (i.e. wherein reflective surface/windscreen is the glass window or transparent polymer of the cockpit). In some examples, vehicle may be a railway vehicle, e.g. not least for example: a train or a tram. In some, but not necessarily all, examples the reflective surface is a separate combiner component, i.e. non-integral to the vehicle to enable retro fitting to the vehicle. In some, but not necessarily all, examples the reflective surface is concave.

In some, but not necessarily all, examples the projection unit is configured to provide an output projected light beam 402 optimised for the particular curved diffractive waveguide it is used with. In some examples, the projection unit is configured to provide an output projected light beam 402 having a focus distance that matches/substantially matches the focus distance of the curved diffractive wave guide 401. In some examples, the projected beam's focus distance is configured to match/substantially match the shape/focus distance of the in-coupling diffraction means 101a (so as to avoid reducing the MTF (Modulation Transfer Function) of the in-coupled projected beam, and thereby reduce/avoid parallel rays on different parts of the curved in-coupling diffraction means being in-coupled at different internal angles that would be perceived later in the system as blur).

Figure 4B:
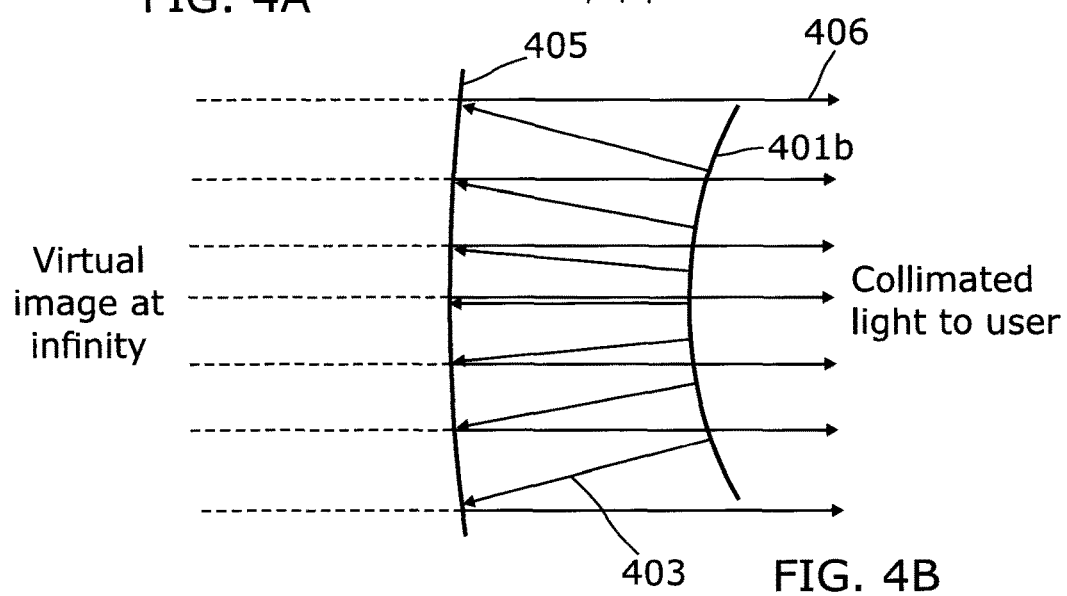
FIG. 4B schematically illustrates a plan view of light rays out-coupled from an apparatus and reflected from a curved reflective surface.

FIG. 4B schematically illustrates a plan view of light rays 403 out-coupled from the out-coupling diffractive means 401c of the apparatus 400 and reflected from the curved reflective surface 405 such that the reflected light beam 406, which is directed towards a user's eye, is collimated.

Figure 4C:
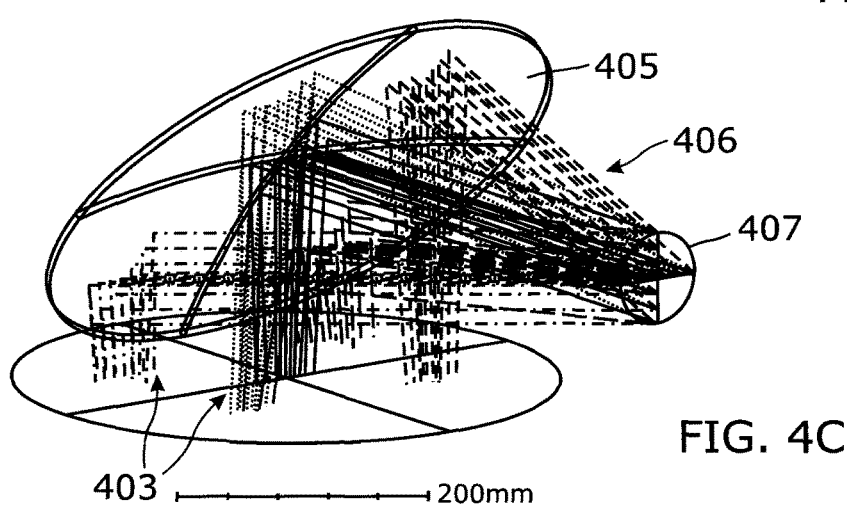
FIG. 4C schematically illustrates light rays reflected from a curved reflective surface.

FIG. 4C illustrates a perspective view of a portion of the curved reflective surface 405 and the light beam/rays 403, having been outputted from the curved diffractive waveguide 401, that are incident to and reflected from the curved reflective surface 405 to a user's eye(s) 407.

In some, but not necessarily all, examples, the diffractive waveguide 401 may be similar in many regards to the flat/planar diffractive EPE waveguide 101 of FIGS. 1-3; namely in that diffractive waveguide 401 likewise comprises a plurality of diffractive means (not shown) configured to: in-couple an input beam of light 402 from a projection unit/optical engine (not shown), expand and out-couple the beam of light to provide an expanded output light beam 403. However, significantly, instead of such a diffractive EPE waveguide 401 being a flat/planar diffractive EPE waveguide 100 as per FIG. 1, a shape of at least a part of the diffractive EPE waveguide 401 is non-flat/non-planar/curved.

For example, whilst the flat EPE waveguide 101 of FIG. 1 may have diffractive gratings 101a, 101b. 101c that comprise lines of diffraction grooves/rulings that are parallel to one another in a flat Euclidean plane/geometry; the curved (e.g. spherical) diffractive EPE waveguide 401 of FIG. 4A may have diffractive means 401a and 401c (e.g. a surface layer of diffraction gratings) that comprise lines of diffraction grooves/rulings that are "parallel" in a curved geometry, e.g. a spherical geometry such that diffraction grooves/rulings run along parallels of latitude or meridians of longitude in a spherical geometry (other curved geometries may be adopted, e.g. curvilinear or cylindrical where the curvature in one axis/direction/dimension differs from the curvature in a different/orthogonal axis/direction/dimension).

Figure 5:
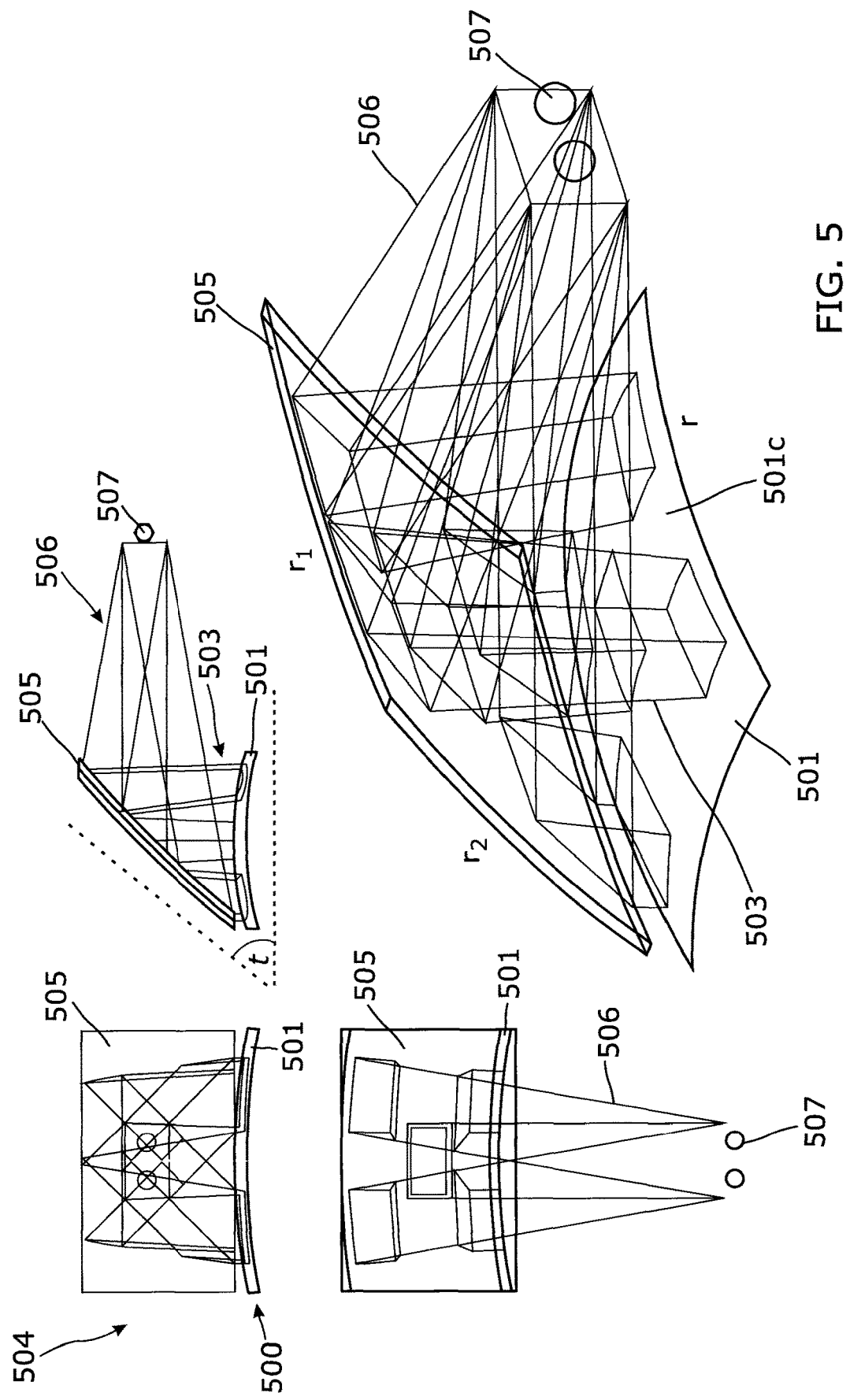
FIG. 5 schematically illustrates views of a further example of an apparatus according to the present disclosure.

FIG. 5 schematically illustrates views (front-on, side-on, plan and perspective views) of a part of a further example of an apparatus 500 according to the present disclosure for use in a reflective HUD system 504 that provides a collimated output beam/image 506 to a user's eyes 507. The reflective HUD system 504 comprises a 2D curved reflective surface 505, i.e. having a first radius of curvature r1 in a first axis/direction and a second differing radius of curvature r2 in a second axis/direction, i.e. such that the reflective surface is curvilinear with differing curvatures in first and second orthogonal directions. The apparatus 500 comprises a diffractive EPE waveguide 501 similar to that of FIG. 4A, i.e. with in-coupling diffraction means (not-shown), expanding diffraction means (not shown) and out-coupling diffraction means 501c.

In this example, the 2D curved reflective surface 505 is tilted relative to the EPE waveguide by a tilt angle t, e.g. 45 degrees. Due to the tilt angle, the resulting effective optical power of the reflective surface is different along different axes/directions. To compensate for this, the curvature of the reflective surface 505 is different for the two differing axes/directions. In particular, the reflective surface 505 is configured to have a two-dimensional curvature with a local radius of curvature in one axes/direction r1, and a local radius of curvature in an orthogonal axes/direction r2.

The curved EPE plate is spherically curved, with a radius of curvature r, configured such that it out-couples light 503 focused at some finite distance. The finite distance/degree of focusing is based on the curvature of the reflective surface and its optical power. The spherically curved EPE plate 501 is configured, via its shape, to apply a degree of focusing to the light such that when the light gets reflected from the 2D curved (concave from inside) reflective surface 505, the focus distance is shifted to infinity.

Figure 6:
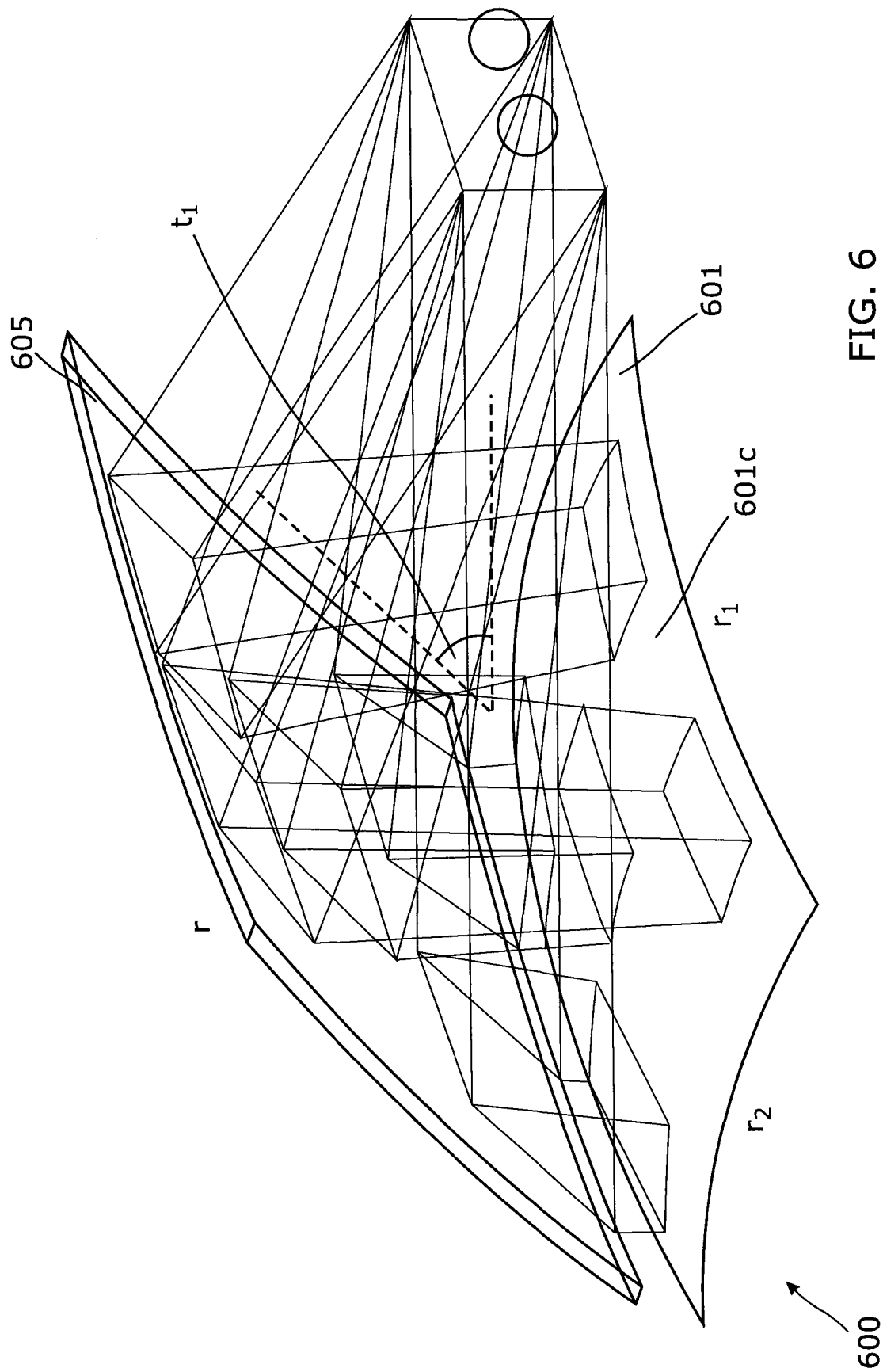
FIG. 6 schematically illustrates a yet further example of an apparatus according to the present disclosure.

FIG. 6 schematically illustrates a yet further example of an apparatus 600 according to the present disclosure, similar of that of FIG. 5, i.e. with in-coupling diffraction means (not-shown), expanding diffraction means (not shown) and out-coupling diffraction means 601c. However, whereas in FIG. 5, the curved diffractive EPE waveguide 501 was spherically curved to complement the 2D curved reflective surface 505 to compensate for the curvature/optical power of the curved reflective surface; in FIG. 6 the reflective surface is spherically curved and the curved diffractive EPE waveguide 601 of FIG. 6 is 2D curved. In particular, the 2D curved EPE waveguide is configured not only to compensate for the curvature/optical power of the curved reflective surface, but also to additionally compensate for the angle of tilt, t1, of the curved reflective surface 605 relative to the diffractive EPE waveguide 601. The tilt angle may be defined by the angle of intersection of a first major plane defined by the reflective surface and a second major plane defined by the EPE waveguide.

The spherically curved reflective surface 605 has a radius of curvature r. The reflective surface 605 is on the optical path of the diffractive EPE waveguide 601 and is tilted relative to the same by a tilt angle t1. Due to this, the resulting effective optical power of the reflective surface is different along different axes/directions. To compensate for this, the curvature of the diffractive EPE waveguide 601 is different for the two differing axes/directions. In particular, the diffractive EPE waveguide is configured to have two-dimensional curvature with a radius of curvature in one axes/direction r1, and a radius of curvature in an orthogonal axes/direction r2.

In some, but not necessarily all examples, the waveguide is configured to have a first radius of curvature in a first direction and a second different radius of curvature in a second direction.

In some, but not necessarily all examples, the waveguide is configured to have a first radius of curvature in a first direction and a second radius of curvature in a second direction, and wherein the first and second radii of curvature are configured to compensate for differing optical powers of the curved reflective surface in the first and second directions.

In some, but not necessarily all examples, the waveguide is configured to have a first radius of curvature in a first direction and a second radius of curvature in a second direction, and wherein the first radius of curvature is configured to compensate for an angle of tilt of the curved reflective surface relative to the waveguide, i.e. the first radius of curvature is dependent, not least, on the angle of tilt of the curved reflective surface relative to the waveguide.

In some, but not necessarily all, examples, where such a 2D curved EPE wave guide is used, the projector (not shown) is configured to have a sagittal focus (different focus distances for x and y axes, i.e. astigmatic output). In this regard, the projected beam's focus distance (in each of x and y axes/directions) is configured to match/substantially match the shape/focus distance of the in-coupling diffraction means 101a (in each of x and y axes/directions) so as to avoid reducing the MTF and the resultant image being perceived to be blurred.

It is to be appreciated that in some, but not necessarily all, examples more complex, non-spherical, shapes, may be utilised. For example, the reflective surface may have a non-spherical curved shape, such as a curvilinear or cylindrical shape, wherein the curvature in one axis/direction/dimension differs from the curvature in a different/orthogonal axis/direction/dimension. The waveguide may then be duly configured to adjust the expanded output light beam so as to compensate for the optical power of such a complex curved shaped reflective surface. For example, the waveguide itself may have a corresponding complex shape being appropriately matched/configured to compensate for the optical power of the complex shaped reflective surface.

Figure 7:
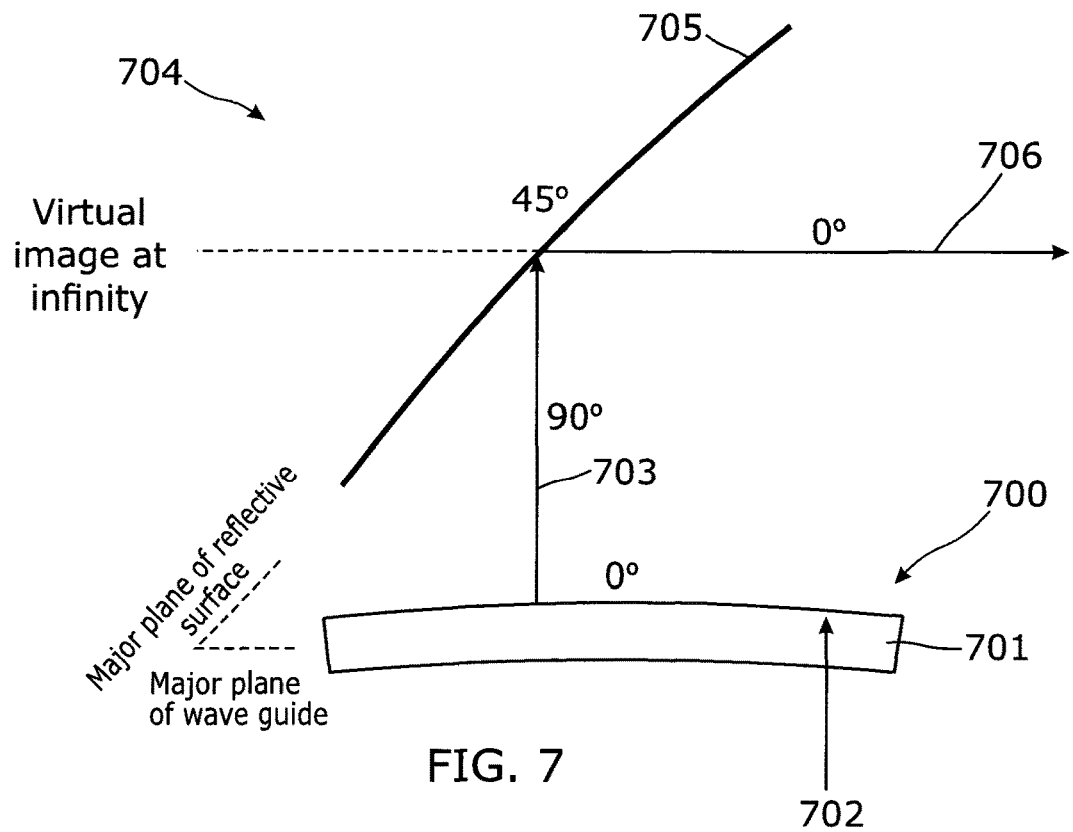
FIG. 7 schematically illustrates an example arrangement of an apparatus according to the present disclosure having a first tilt angle.

FIG. 7 schematically illustrates an example arrangement of an apparatus 700, comprising a curved EPE waveguide 701, for use in a HUD system 704 with a curved reflective surface 705 having a tilt angle at or near to 45 degrees relative to the horizontally aligned EPE waveguide 701 for providing a reflected beam 706 to a user that is horizontally aligned. In this regard, the in-coupling diffraction means may be configured so as to be optimised for in-coupling an input beam of light 702 that is incident in a direction normal to the in-coupling diffraction means. Likewise, the out-coupling diffraction means may be configured so as to be optimised for out-coupling the beam of light 703 in a direction normal to the out-coupling diffraction means. Such configuration may relate to the: grating periods, depths, shapes, orientations, coating and material properties (e.g. refractive index) of the waveguide's DOE's.

Clearly, it is to be appreciated that it would be possible for different angles to be chosen, e.g. due to the construction of the vehicle dashboard/cockpit, optimized aerodynamics, optimized image quality, or simplified optics design. In some, but not necessarily all examples, a reflection based HUD system comprising a curved EPE waveguide and curved reflective surface may be designed such that the curvature and relative orientation/alignment of the reflective surface are adjusted, i.e. the curved reflective surface is designed to have a particular pre-determined tilt angle/ relative alignment with respect to the curved EPE waveguide.

Figure 8:
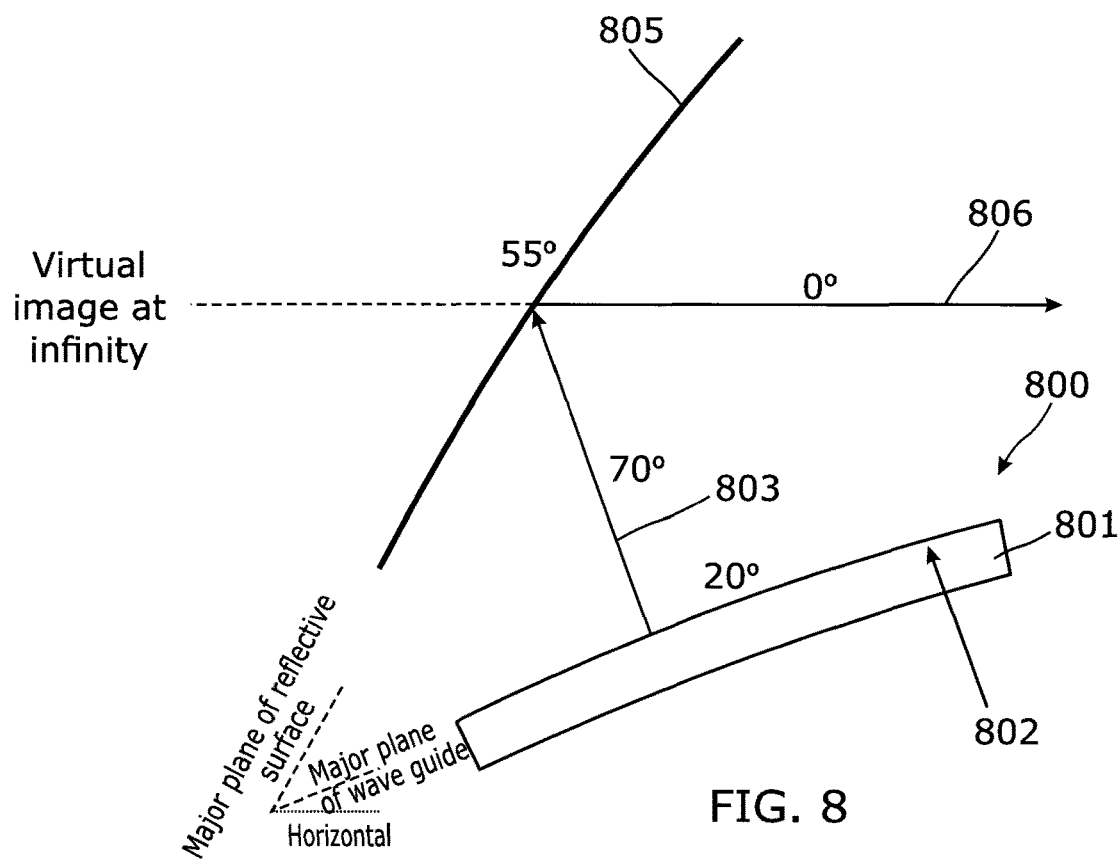
FIG. 8 schematically illustrates another example arrangement of an apparatus according to the present disclosure having a second tilt angle.

FIG. 8 illustrates the EPE waveguide 801 tilted at 20 degrees to the horizontal (for example, where the apparatus is used in a vehicle's HUD, the EPE waveguide 801 may be titled in such a manner so as to align with a glare shield of the vehicle (not shown)). The reflective surface 805 may consequently itself be tilted by an additional 10 degrees on top of the previous 45 degrees, i.e. to 55 degrees, so as to maintain a horizontal direction of the reflected image beam 806. Such a geometrical arrangement may make it easier to design the various optical components, e.g. both the shape of the EPE waveguide, as well as the shape of the reflective surface, can be substantially spherical.

An input beam of light 802 that is incident in a direction normal to the in-coupling diffraction means (i.e. the input beam of light 802 being incident at an angle of 70 degree to the horizontal), is correspondingly out-coupled to provide an output beam of light 803 in a direction normal to the out-coupling diffraction means (i.e. at an angle of 70 degree to the horizontal).

Figure 9:
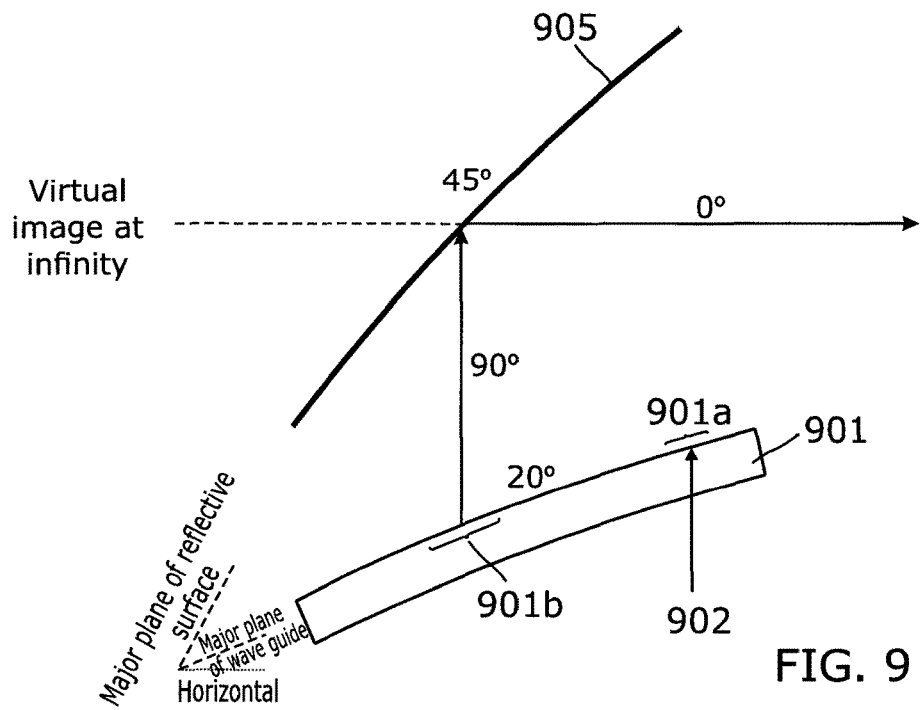
FIG. 9 schematically illustrates yet another example arrangement of an apparatus according to the present disclosure having a third tilt angle.

In FIG. 9, the in-coupling and out-coupling diffraction means 901a, 901b on the curved EPE waveguide 901 are configured to have optimized light input and output angles other than perpendicular/normal to their respective surfaces. Such configuration may relate to the: grating periods, depths, shapes, orientations, coating and material properties (e.g. refractive index) of the waveguide's DOE's. This enables the curved EPE waveguide 901 to be tilted relative to the horizontal (e.g. by 20 degrees, e.g. so as to align with a glare shield of the vehicle (not shown)) without requiring the tilt angle of the reflective surface 905 to be adjusted. The titled curved EPE waveguide 901 is configured to in-couple an input beam 902 received from a vertical direction and out-couple the beam in a vertical direction (i.e. similar to the vertical light output of FIGS. 4A to 7). The ability to adjust the optimised in-coupling angle and out-coupling angle of the curved EPE waveguide can be used to further optimize/ simplify the optical design of a HUD system.

In some, but not necessarily all, examples, the in-coupling diffraction means is configured to have an optimised input light angle for receiving and in-coupling incident input light into the waveguide that is non-normal to the in-coupling diffraction means. In some, but not necessarily all, examples, the in-coupling diffraction means is configured in dependence on an angle of tilt of the curved reflective surface relative to the waveguide. In some, but not necessarily all, examples, the out-coupling diffraction means is configured to have an optimised output light angle for out-coupling the output light from the waveguide that is non-normal to the out-coupling diffraction means. In some, but not necessarily all, examples, the out-coupling diffraction means is configured in dependence on an angle of tilt of the curved reflective surface relative to the waveguide. Such configuration of the diffraction means may relate to the: grating periods, depths, shapes, orientations, coating and material properties (e.g. refractive index) of the diffraction means.

Figure 10:
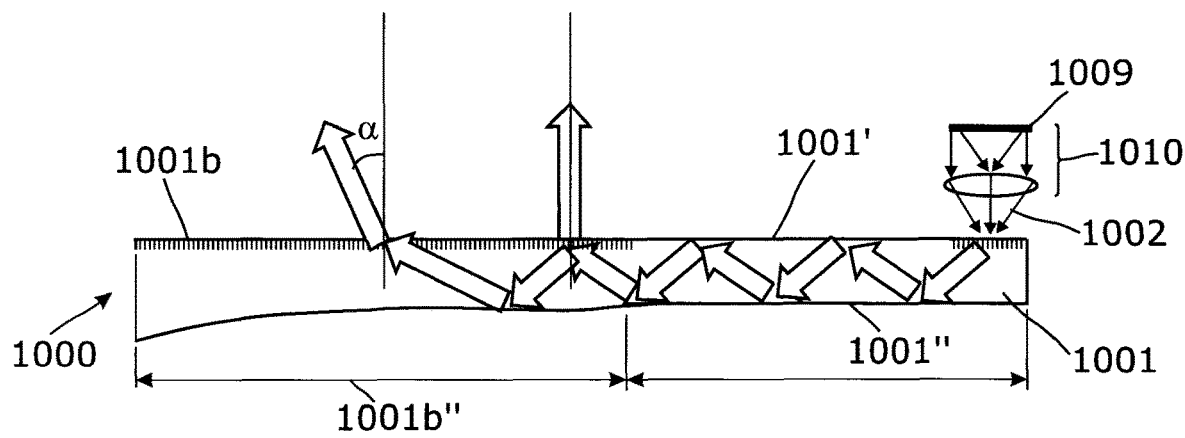
FIG. 10 schematically illustrates an alternative example of an apparatus according to the present disclosure.

FIG. 10 schematically illustrates an example of an apparatus 1000 according to a second aspect of the present disclosure. In the above described examples of the first aspect of the present disclosure, a shape of the EPE waveguide is configured in view of the curvature of the reflective surface. In various examples of the same, instead of having a flat EPE plate, a curved EPE plate is used (e.g. spherically curved, wherein the local radius of curvature in two orthogonal directions tangential to the curved surface are the same [as per FIG. 5], or wherein the local radius of curvature in two orthogonal directions tangential to the curved surface are the different [as per FIG. 6]. In examples of the second aspect of the present disclosure, a shape of one side 1001' of the EPE plate remains flat/planar, and the opposite side

1001" of the EPE plate 1001 is adjusted/curved so as to compensate for the curvature of the curved reflective surface 1005.

A compensating surface 1001b" is applied on the back side 1001" of the EPE plate 1001, opposite the out-coupling diffractive means 1001b (that is sufficiently large to provide the desired eye-box and field of view for the intended viewer [e.g. driver of a car/pilot of an aircraft when the apparatus is used in a HUD for automotive or avionics use]). The compensating surface 1001b" acts as a pre-distortion surface counteracting the distortions that happen in the reflectance off the curved reflective surface 1005 (e.g. windshield or cockpit glass). A reflecting film (not shown) can also be applied on the reflective surface 1005 to enhance the reflection of the wavelength band used in the HUD.

In some, but not necessarily all, examples, the shape of one of an upper surface of the waveguide and a lower surface of the waveguide is configured to have a shape that is dependent on the shape of the curved reflective surface, and the shape of the other of the upper surface and the lower surface is configured to be substantially planar.

Figure 11:
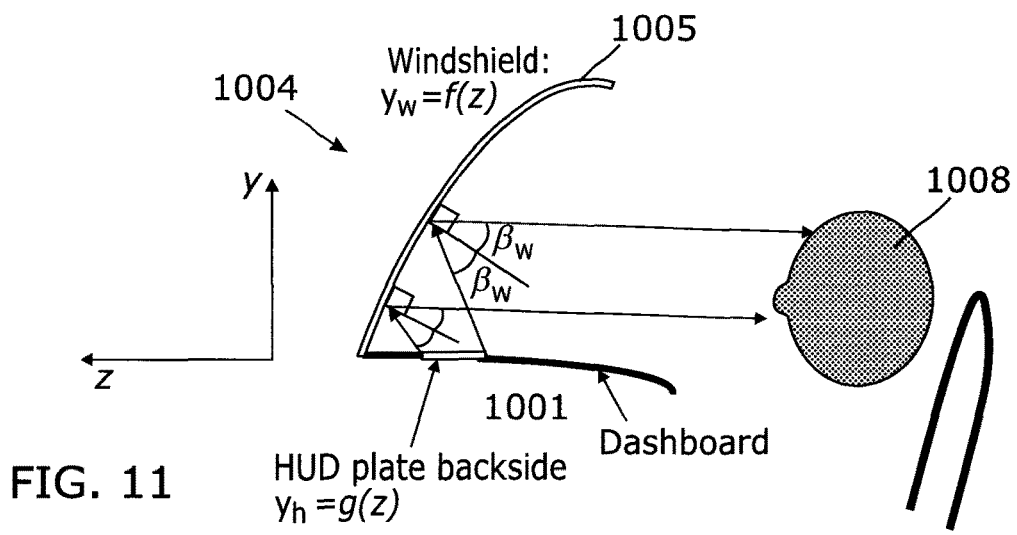
FIG. 11 schematically illustrates an arrangement of the apparatus of FIG. 10.

FIG. 11 schematically illustrates the apparatus 1000 of FIG. 10 used in a HUD 1004 for a vehicle. Image/visual information 1002 to be presented to a viewer 1008 is generated in a microdisplay device 1009 of a projection unit/optical engine 1010 that directs the image 1002 to the EPE waveguide 1001 for in-coupling, expanding and out-coupling to provide an expanded output image that reflects off the windshield so that the user sees a distortion-free Image/visual information, thereby providing an augmented reality display to the user.

As can be seen in FIG. 10, the shape of the backside of the EPE waveguide in the compensating surface region 1001b" is configured to provide only one "bounce" of light off the back face before the light is diffracted out of the EPE waveguide towards the windshield. It is possible to design the backside compensating surface 1001b" of the EPE waveguide 1001 for a particular windshield taking into account the precise shape of the windshield in order to produce a distortion-free reflected image (having an expanded field/eye-box).

The shape of the windshield is denoted as $y_w = f(z)$. The shape of the backside compensating surface region 1001b" of the EPE waveguide is denoted as $y_h = g(z)$. The angle at which the light reflects off the windshield is denoted as $\beta_w$.

In the general case, the windshield shape can curve in two directions so that the function becomes $y_h = g(x, z)$. The calculations shown here are presented in just the one direction, for simplicity. It is customary to define the z-axis as the main optical axis, in this case, the direction toward the user's view through the windshield. We make the following assumptions:

Light is reflected off the windshield toward the user in the direction of the z-axis.

The diffraction gratings of the EPE waveguide have a period d, the diffraction order is m, and the wavelength of the light is l.

The light inside the EPE waveguide is directed to reflect in total internal reflection at an angle a.

It is now possible to define, for the diffraction grating:

$$h = ml/d$$

This is the only parameter we need to know about the grating in the calculation for g(z), as for the grating we use the grating equation:

$$\sin q_m - \sin q_i = h$$

where is the incoming light, and $q_m$ is the diffracted light (of order m).

From the geometry:

$$q_m = p/2 - 2b_w$$

and since the angle $b_w$ is defined with respect to the normal of the slope f' (differential) of the function f, we get:

$$q_m = p/2 - a\tan(-1/y_w')$$

and thus $$q_i = a\sin(\sin q_m - h) = a\sin(\sin(p/2 - a\tan(-1/y_w')) - h) \quad (1)$$

At the surface g, the incoming light is defined by the design total internal reflection direction a, and the reflection off the surface g can be calculated similarly to the previous treatment for surface f:

$$q_i = a\tan(-1/y_h') - a \quad (2)$$

Equating (1) and (2) we have an expression relating $y_h'$ to $y_w'$ from which it is possible to solve for the function $y_h = g(z)$:

$$g(z) = \int \cot(a\sin \tau + \alpha) dz$$

where $t = \cos(2 a \tan(1/y_w')) - h)$.

Therefore, if the function $y_w = f(z)$ that describes the windshield shape is known, it is possible to calculate the shape of the bottom of the waveguide plate $y_h = g(z)$ so that it satisfies the requirement that the light reflecting off the windshield is directed to the user in a parallel direction within the eye-box.

It is of course possible to apply a similar calculation over the windshield surface to design another focus distance, such as a few meters away. and implement a waveguide shape that compensates for the windshield curvature, adding optical power such as to bring the perceived image closer to the user from infinity In some examples:

The surface $y_h = g(x, z)$ is formed on the top side of the waveguide, with the diffraction grating on the bottom side (the same calculation in two directions).

The surface $y_h = g(z)$ is formed on the bottom/top and the corresponding surface $y_h = g(x)$ is formed on the diffraction grating side of the plate (opposite to the g(z) side), shaping the grating in such a way that the light arrives at it in a direction where the light rays are perpendicular to the grating lines.

The same calculation is applied successively at two or more sections of the waveguide in such a way that the resultant compound effect of the modified reflections off the surfaces is achieved at the reflection off the windshield. In this case, very mild successive modifications of the surface topology of the waveguide is required.

In a stacked EPE solution (such as when using multiple wavelengths) the formed surface can be in different sides and/or locations for each waveguide.

the windshield or cockpit glass surface is coated with a suitable dichroic filter structure in order to preferentially reflect the desired wavelength band of the projected image off the glass towards the user, which may advantageously reduce the power requirements for the optics engine.

In some but not necessarily all examples, the modified shape can be realized by precision grinding on glass, by diamond turning, or by making a (diamond-turned) mould that can be used for extrusion or other moulding techniques for optical polymers or for glasses. The same mould can incorporate a diffraction grating master.

Advantages of aspects of the present disclosure include providing an improved user experience by providing a distortion-free image at infinity. In addition, no extra components are required to provide the reflection (e.g. since the windshield or cockpit glass are integral parts of the vehicle). Furthermore, the use of EPE based waveguides enables the use of a relatively small/flat/low footprint projector in the HUD setup, i.e. as compared to conventional HUD systems.

Figure 12:
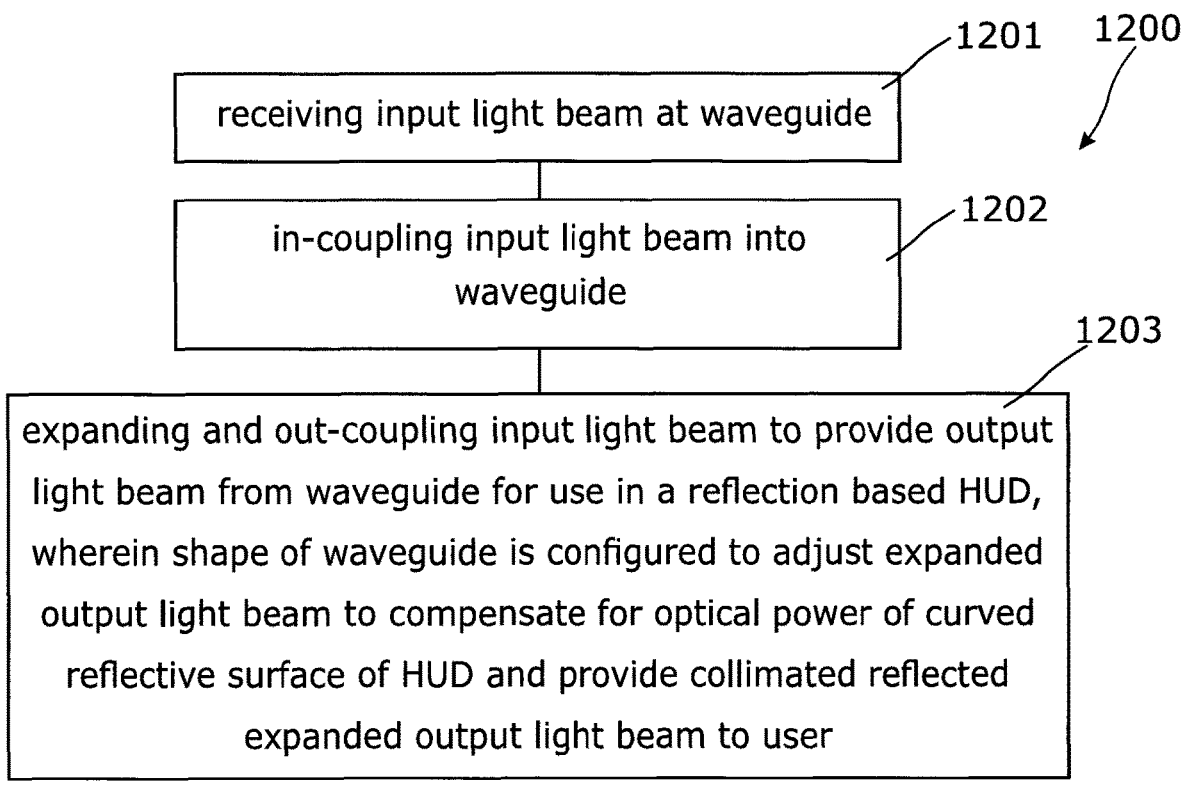
FIG. 12 schematically illustrates an example of a method according to the present disclosure.

FIG. 12 schematically illustrates a method 1200. In block 1201, an input light beam is received at a waveguide. In block 1202, the input light beam is in-coupled, via first diffraction means of the waveguide, into the waveguide. In block 1203, the in-coupled input light beam is expanded and out-coupled, via at least second diffraction means of the waveguide, from the waveguide to provide an expanded output light beam configured for use in a reflection based heads-up display system, wherein a shape of at least a part of the waveguide is configured to adjust the expanded output light beam so as to compensate for a non-zero optical power of a curved reflective surface of the reflection based heads-up display and provide a collimated reflected expanded output light beam to the user's eye.

Examples of the present disclosure provide both a method and corresponding apparatus comprising various means and components or that provides the functionality for performing/applying the actions of the method.

The above-described examples may find application as enabling components of: automotive systems; electronic systems including consumer electronic products; distributed computing systems; media systems for generating or rendering media content including audio, visual and audiovisual content and mixed, mediated, virtual and/or augmented reality; navigation systems; user interfaces also known as human-machine interfaces.

Where a structural feature has been described, it may be replaced by means for performing one or more of the functions of the structural feature whether that function or those functions are explicitly or implicitly described.

Although specific terms are employed herein, they are used in a generic and descriptive sense only and not for purposes of limitation.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not. Accordingly, features described in relation to one example/aspect of the disclosure may include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances, the use of 'at least one' or 'one or more' may be used to emphasize an inclusive meaning but the absence of these terms should not be taken to infer an exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described hereinabove and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims may be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims may depend from any other claims and that to the extent that any alternative embodiments may result from combining, integrating, and/or omitting features of the various claims and/or changing dependencies of claims, any such alternative embodiments and their equivalents are also within the scope of the disclosure.

We claim:

1. An apparatus comprising:
a waveguide comprising a plurality of diffractive sections comprising an in-coupling diffractive section configured to in couple an input beam of light into the waveguide, expand the input beam of light, and an out-coupling diffractive section configured to out-couple the expanded beam of light from the waveguide to provide an expanded output light beam configured for use in a reflection based heads-up display system wherein the expanded output light beam is configured to be directed to a curved reflective surface, having a non-zero optical power, for reflection therefrom to a user's eye;
wherein the waveguide is configured to adjust the expanded output light beam so as to compensate for the optical power of the curved reflective surface and provide a collimated reflected expanded output light beam to the user's eye.

2. The apparatus of claim 1, wherein the waveguide is configured to have an optical power opposite to the optical power of the curved reflective surface.

3. The apparatus of claim 1, wherein a shape of at least a part of the waveguide is configured to adjust the expanded output light beam so as to compensate for the optical power of the curved reflective surface and provide a collimated reflected expanded output light beam to the user's eye.

4. The apparatus of claim 1, wherein the shapes of an upper surface of the waveguide and a lower surface of the waveguide are configured to provide an optical power that compensates for the optical power of the curved reflective surface.

5. The apparatus of claim 1, wherein the waveguide is configured to have a curvature that is configured to provide an optical power that compensates for the optical power of the curved reflective surface.

6. The apparatus of claim 1, wherein the waveguide is configured to have a radius of curvature that is configured to provide an optical power that compensates for the optical power of the curved reflective surface.

7. The apparatus of claim 1, wherein the waveguide is configured to have a first radius of curvature in a first direction and a second differencing radius of curvature in a second direction.

8. The apparatus of claim 1, wherein the waveguide is configured to have a first radius of curvature in a first direction and a second differing radius of curvature in a second direction, and wherein the first and second radii of curvature are configured to compensate for differing optical powers of the curved reflective surface in the first and second directions.

9. The apparatus of claim 1, wherein the waveguide is configured to have a first radius of curvature in a first direction and a second radius of curvature in a second direction, and wherein the first radius of curvature is configured to compensate for an angle of tilt of the curved reflective surface relative to the waveguide.

10. The apparatus of claim 1, wherein the in-coupling diffraction section is configured to have an optimised input light angle for receiving and in-coupling incident input light into the waveguide that is non-normal to the in-coupling diffraction section.

11. The apparatus of claim 1, wherein the in-coupling diffraction section is configured in dependence on an angle of tilt of the curved reflective surface relative to the waveguide.

12. The apparatus of claim 1, wherein the out-coupling diffraction section is configured to have an optimised output light angle for out-coupling the output light from the waveguide that is non-normal to the out-coupling diffraction section.

13. The apparatus of claim 1, wherein the out-coupling diffraction section is configured in dependence on an angle of tilt of the curved reflective surface relative to the waveguide.

14. The apparatus of claim 1, wherein the shape of one of an upper surface of the waveguide and a lower surface of the waveguide is configured to have a shape that is dependent on the shape of the curved reflective surface, and the shape of the other of the upper surface and the lower surface is configured to be substantially planar.

15. The apparatus of claim 1, wherein the curved reflective surface is a windscreen of a vehicle.

16. A system comprising:
the apparatus of claim 1; and
the curved reflective surface.

17. An apparatus comprising:
a waveguide comprising a plurality of diffractive sections comprising an in-coupling diffractive section configured to in couple an input beam of light into the waveguide, expand the input beam of light, and an out-coupling diffractive section configured to out-couple the expanded beam of light from the waveguide, wherein the waveguide is suitable for use in providing an expanded output light beam for use in a reflection based heads-up display system wherein the expanded output light beam is configured to be directed to a curved reflective surface, having a non-zero optical power, for reflection therefrom to provide a collimated reflected expanded output light beam to a user's eye;
wherein the waveguide is configured to have a first curvature in a first direction and a second, differing, curvature in a second, differing, direction.

18. A method comprising causing, at least in part, actions that result in:
receiving, at a waveguide, an input light beam;
in-coupling, via a first diffraction section of the waveguide, the input light beam into the waveguide;
expanding and out-coupling, via at least one second diffraction section of the waveguide, the in-coupled input light beam to provide an expanded output light beam configured for use in a reflection based heads-up display system; wherein the waveguide is configured to adjust the expanded output light beam so as to compensate for a non-zero optical power of a curved reflective surface of the reflection based heads-up display and provide a collimated reflected expanded output light beam to the user's eye.

19. An apparatus comprising:
a waveguide comprising a plurality of diffractive optical elements configured to: in-couple an input beam of light into the waveguide, expand the input beam of light, and out-couple the expanded beam of light from the waveguide to provide an expanded output light beam configured for use in a reflection based heads-up display system wherein the expanded output light beam is directed to a curved reflective surface, having a non-zero optical power, for reflection therefrom to a user's eye;

wherein the waveguide is configured to adjust the expanded output light beam so as to compensate for the optical power of the curved reflective surface and provide a collimated reflected expanded output light beam to the user's eye.

* * * * *